United States Patent
Watanabe

[19]

[11] Patent Number: 6,144,294
[45] Date of Patent: Nov. 7, 2000

[54] CAR ANTITHEFT APPARATUS

[75] Inventor: Motohiko Watanabe, Hyogo-ken, Japan

[73] Assignee: Mitsubishi Denki Kabushiki Kaisha, Tokyo, Japan

[21] Appl. No.: 09/188,373

[22] Filed: Nov. 10, 1998

[30] Foreign Application Priority Data

Jun. 4, 1998 [JP] Japan ................................. 10-156166

[51] Int. Cl.$^7$ ................................................ B60R 25/10
[52] U.S. Cl. ........................ 340/426; 340/430; 307/10.2; 307/10.6
[58] Field of Search .................................... 340/426, 430; 307/10.2, 10.3, 10.5, 10.6

[56] References Cited

U.S. PATENT DOCUMENTS

| 5,486,806 | 1/1996 | Firari et al. .............................. 340/426 |
| 5,668,416 | 9/1997 | Watanabe ................................. 307/10.5 |
| 5,684,454 | 11/1997 | Nishioka et al. ........................ 340/426 |
| 5,703,414 | 12/1997 | Mutoh et al. ............................ 307/10.5 |

FOREIGN PATENT DOCUMENTS

| 0 704 354 A2 | 4/1996 | European Pat. Off. ......... B60R 25/04 |
| 0 785 114 A2 | 7/1997 | European Pat. Off. ......... B60R 25/04 |
| 195 16246 C2 | 11/1995 | Germany ......................... B60R 25/04 |
| 44 34450 A1 | 3/1996 | Germany ......................... B60R 25/04 |
| 6-227364 | 8/1994 | Japan . |
| 9-95211 | 4/1997 | Japan . |
| 9-144633 | 6/1997 | Japan . |

*Primary Examiner*—Edward Lefkowitz
*Attorney, Agent, or Firm*—Sughrue, Mion, Zinn Macpeak & Seas, PLLC

[57] ABSTRACT

To prevent a theft of a car with a forged key, the start of an engine is permitted irrespective of the result of judgement of start judging means for a predetermined time after a key switch is turned on and the engine is stopped after the passage of the predetermined time and when the start judging means judges that the start of the engine should be inhibited.

6 Claims, 4 Drawing Sheets

CAR ANTITHEFT APPARATUS

BACKGROUND OF THE INVENTION

1. Field of the Invention

The present invention relates to a car antitheft apparatus for preventing driving of a car when the car has been stolen.

2. Description of the Prior Art

When a car is stolen, the illegal operation of a starter circuit (direct connection of a starter power supply), use of a forged key and the like are conceivable, and countermeasures against these are required.

An antitheft apparatus for preventing these is disclosed by, for example, Japanese Laid-open Patent Application No. 6-227364. In this antitheft apparatus, paying attention to a recent increase in the number of cars in which the amount of fuel to an engine and the ignition time are controlled by an engine controller, it is electronically judged whether the key used to start the engine is a correct key, data on whether the engine should be started is electronically transmitted to the engine controller based on the result of this judgment, and the supply of fuel to the engine and ignition are controlled to start the engine. Stated more specifically, this antitheft apparatus collates an electronic code stored in the key with the preset correct code and outputs the result of collation to the engine controller which in turn judges whether the engine should be started according to the result of collation received from the above antitheft apparatus and does not control the engine until it judges that the engine can be started.

However, information on whether the engine should be started with a correct key is transmitted and received over a single communication line, and the start of the engine is delayed by a time required for the transmission and reception of the above information when the supply of fuel to the engine and ignition are controlled.

According to the operational environment at the time of the start of the engine (when the temperature is extremely low or a weak battery is used), it is difficult to ensure an operation voltage for the communication line for exchanging the above information, thereby making it difficult to transmit and receive correct information and further extending the time required for the transmission and reception of the information. As a result, there is a possibility that the startability of the engine further deteriorates.

Since there are differences in reset/reset canceling voltage and reset canceling timing between the antitheft apparatus and the engine controller, there is a difference in information exchange start timing between these apparatuses. As a result, it is possible that there occurs a so-called communication collision that the transmission and reception of information on whether the engine should be started cannot be performed smoothly due to a difference in recognition between the apparatuses, the time required for the transmission and reception of the information is extended, and the startability of the engine further deteriorates.

The applicant of the present invention proposes a technology for preventing a delay in the start of the engine by eliminating the above communication collision by providing a communication protocol for returning the result of recognizing the contents of transmission data on a receiver's side when data is transmitted from either the antitheft apparatus or the engine controller.

However, since the start of the engine is impossible during a time required for the communication of information for judging whether the engine should be started in all of the above prior arts, even when the engine is started with a correct key, the engine cannot be started immediately after the key switch is turned on.

SUMMARY OF THE INVENTION

It is an object of the present invention which has been made in view of the above problems of the prior art to provide a car antitheft apparatus which can prevent a theft of a car with a forged key and can improve the startability of an engine.

According to a first aspect of the present invention, there is provided a car antitheft apparatus which comprises start judging means for judging whether an engine should be started based on an external signal, start control means for permitting or inhibiting the start of the engine based on the result of judgment of the start judging means, permitting means for permitting the start of the engine irrespective of the result of judgment of the start judging means for a predetermined time after a key switch is turned on, and stopping means for stopping the engine after the passage of the above predetermined time and when the start judging means judges that the start of the engine should be inhibited.

According to a second aspect of the present invention, there is provided a car antitheft apparatus, wherein the above predetermined time is set to about 10 sec or less.

According to a third aspect of the present invention, there is provided a car antitheft apparatus, wherein the start of the engine by the permitting means can be carried out a plurality of times continuously.

According to a fourth aspect of the present invention, there is provided a car antitheft apparatus, wherein the above predetermined time is changed based on the result of the previous judgement of the start judging means.

According to a fifth aspect of the present invention, there is provided a car antitheft apparatus, wherein the above predetermined time is set to a predetermined value when the result of the previous judgment of the start judging means is the permission of the start of the engine and to a value smaller than the previous predetermined value when the result the previous judgment is the inhibition of the start of the engine.

According to a sixth aspect of the present invention, there is provided a car antitheft apparatus, wherein power cutoff detection means for detecting that firm power supplied from power supply means is cut off is provided, and the above predetermined time is set to "0" when a power cutoff is detected.

The above and other objects, features and advantages of the present invention will become more apparent from the following description when taken in conjunction with the accompanying drawings.

BRIEF DESCRIPTION OF THE ACCOMPANYING DRAWINGS

FIG. 1 a block diagram showing the configuration of a car antitheft apparatus according to Embodiment 1 of the present invention;

DETAILED DESCRIPTION OF THE PREFERRED EMBODIMENTS

Preferred embodiments of the present invention will be described hereinunder with reference to the accompanying drawings.

Embodiment 1

Figure 1:
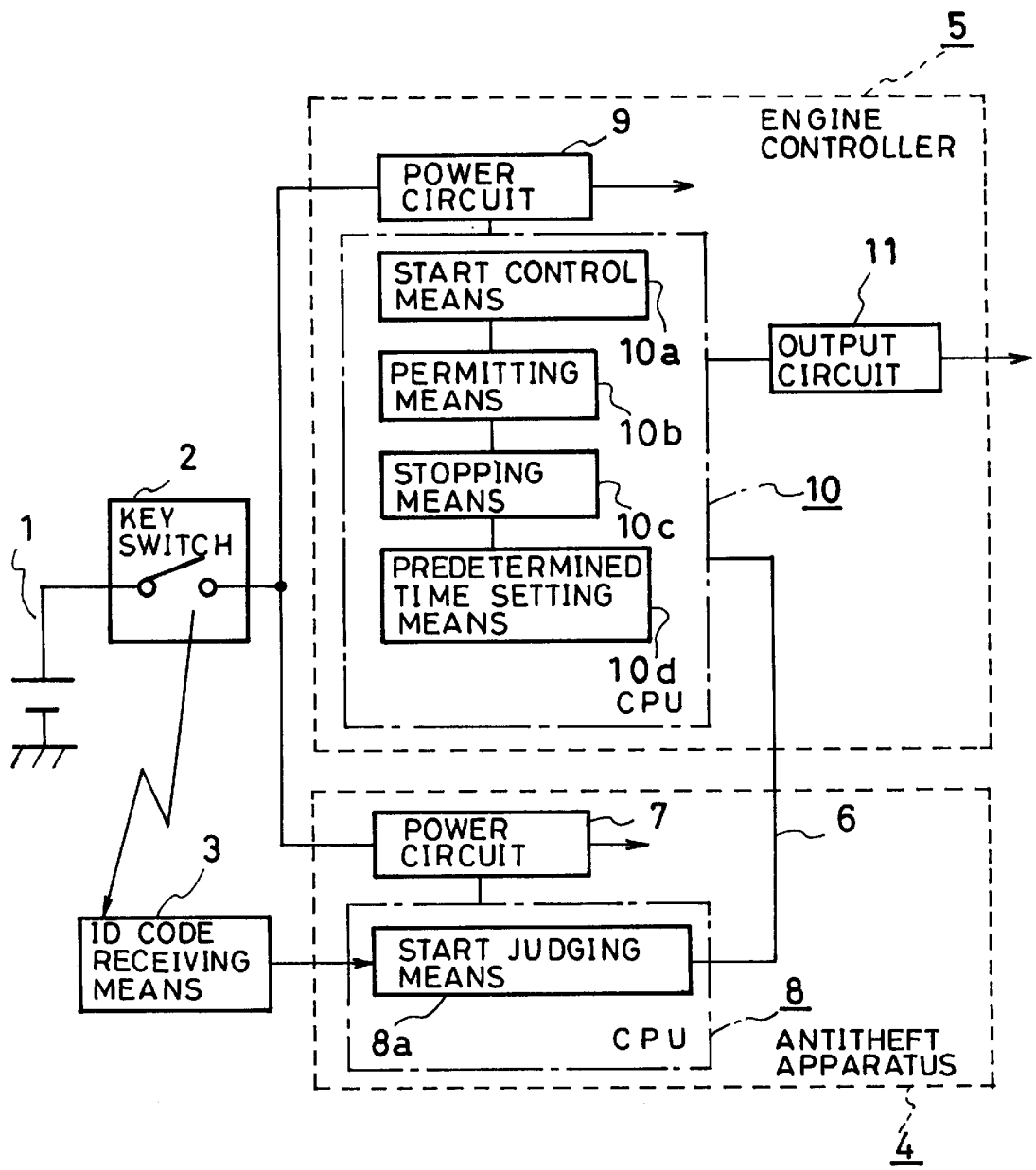

FIG. 1 is a block diagram showing the configuration of a car antitheft apparatus according to Embodiment 1 of the present invention. Reference numeral 1 denotes a battery as power supply means, and 2 a key switch which is turned on and off by an unshown key and incorporates code read means for reading a specific ID code stored in the storage circuit of the unshown key without contact, converting it into an electric signal (ID code) as an external signal and transmitting the electric signal. Denoted by 3 is ID code receiving means for receiving the ID code transmitted from the code read means of the key switch 2 and transmitting the received ID code to an antitheft apparatus 4. Reference numeral 4 represents the antitheft apparatus having a power circuit 7 for generating a constant voltage of about 5 V when it is supplied with power from the battery 1 and a CPU 8 having start judging means 8a for judging whether the engine should be started based on the received ID code, and 5 an engine controller for controlling the supply of fuel to the engine and ignition time based on outputs from sensors for detecting the operation state of the engine and controlling the permission or inhibition of the start of the engine.

The engine controller 5 comprises a power circuit 9 for generating a constant voltage of about 5 V when it is supplied with power from the battery 1, a CPU 10 having start control means 10a for outputting a signal indicative of the permission or inhibition of the start of the engine based on the result of judgment of the antitheft apparatus 4, permitting means 10b for permitting the start of the engine irrespective of the result of judgment on the start of the engine of the antitheft apparatus 4 for a predetermined time after the key switch is turned on, stopping means 10c for stopping the engine after the passage of the above predetermined time and when the start control means 10a judges that the start of the engine should be inhibited and predetermined time setting means 10d for setting the above predetermined time, and an output circuit 11 for controlling an actuator provided in each unit of the engine. This output circuit 11 allows for the operation of each actuator when it receives a start permission signal from the CPU 10 and inhibits the operation of each actuator when it receives a start inhibition signal from the CPU 10.

A description is subsequently given of the operation of the car antitheft apparatus shown in FIG. 1.

When the key switch 2 is turned on by an unshown key, power is supplied to the power circuits 7 and 9 of the antitheft apparatus 4 and the engine controller 5 from the battery 1 to start operation. The key switch 2 reads an ID code from the inserted key without contact, converts it into an electric signal and transmits the electric signal to the ID code receiving means 3. The ID code receiving means 3 transmits this ID code to the start judging means 8a of the antitheft apparatus 4. The start judging means 8a judges whether the received ID code is correct or not. The CPU 8 generates information on whether the engine should be started and some security codes for carrying out an antitheft function based on the result of judgment of the start judging means 8a.

The CPU 10 in the engine controller 5 requests the CPU 8 in the antitheft apparatus 4 for the transmission of the information on whether the engine should be started and the security codes over the communication line 6. In response to this request, the CPU 8 in the antitheft apparatus 4 transmits these information to the CPU 10 in the engine controller 5 over the communication line 6. That is, serial communication between the CPU 8 in the antitheft apparatus 4 and the CPU 10 in the engine controller 5 is carried out over the single communication line 6. The CPU 10 in the engine controller 5 generates an engine start permission signal or an engine start inhibition signal based on the information on whether the engine should be started transmitted from the start control means 10a and determines the permission or inhibition of the start of the engine based on the engine start permission or inhibition signal and signals from the permitting means 10b and the stopping means 10c which will be described hereinafter. The output circuit 11 enables the operation of each actuator when it receives a start permission signal and inhibits the operation of each actuator when it receives a start inhibition signal.

When the engine start inhibition signal is generated, the operation of either one or more of a fuel supply system for the engine, an ignition control system, a driving system and the like is restricted. Means for restricting the operation is, for example, to make the calculation result of the amount of fuel zero, stop the driving of an injector or the driving of a fuel pump in the fuel supply system, stop power supply to an ignition coil in the ignition control system, inhibit the driving of a starter in the driving system and the like.

Meanwhile, the permitting means 10b incorporated as a program in the CPU 10 of the engine controller 5 generates a start permission signal for a predetermined time (for example, 10 sec or less) after it is detected that the key switch 2 is turned on. That is, the CPU 10 in the engine controller 5 has a function to generate a start permission signal based on information on whether the engine should be started transmitted from the antitheft apparatus 4 (start judging means 8a) and a function to generate a start permission signal for a predetermined time after the key switch 2 is turned on (permitting means 10b). When either one of the two functions generates a start permission signal, the start permission signal is output.

Figure 2:
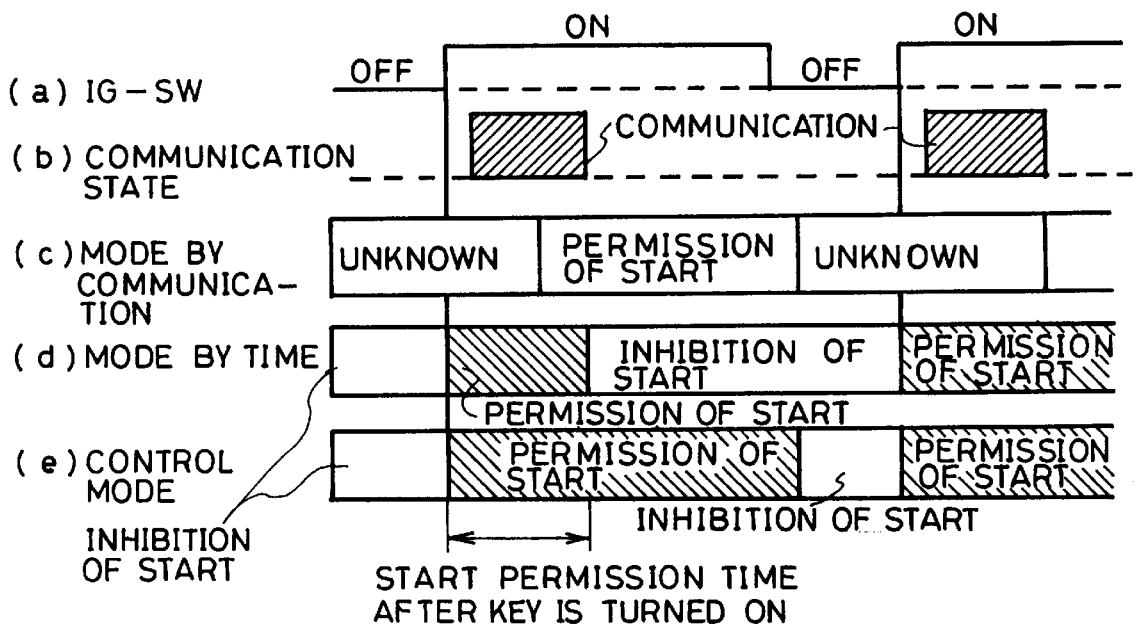
FIG. 2 is a timing chart showing the operation of Embodiment 1.

FIG. 2 is a timing chart showing the operation of permitting or inhibiting the start of the engine in Embodiment 1 of the present invention, which shows the case where the engine is started with a correct key. When the key switch 2 is turned on (IG-SW is turned on) (FIG. 2(a)), communication is carried out between the antitheft apparatus 4 and the engine controller 5 (FIG. 2(b)). Since the transmission and reception of information on whether the engine should be started with a correct key is carried out during this time, a control mode by communication is an unknown state as shown in FIG. 2(c). In this case, although the start of the engine is impossible in the prior art apparatus, in this Embodiment 1, the start of the engine is permitted in a control mode (control mode by time) by the permitting means 10b as shown in FIG. 2(d) and hence, the control mode for the start of the engine is such that the start of the engine is permitted immediately after the key switch 2 is turned on as shown in FIG. 2(e). Therefore, when the engine is started with the correct key, the engine can be started at once.

Since the operation time of the engine by the above permitting means 10b is limited to a predetermined time preset by the predetermined time setting means 10d (start permission time after the key is turned on shown in FIG. 2(d)), when the start permission time has passed, the control mode by time is switched to the inhibition of the start of the engine and the running engine is stopped by the stopping means 10c. In the above example, as shown in FIG. 2(c), since it is judged that the engine is started with the correct key before the passage of the start permission time of the permitting means 10b and the control mode by communication is a start permission mode, a start permission signal is output from the CPU 10 even after the passage of the predetermined time and the running of the engine is continued.

Therefore, when the engine is started with the correct key, the engine can be started by the permitting means 10a immediately after the key switch 2 is turned, and the running of the engine can be continued by a start permission signal output based on judgment that the engine is started with the correct key before the passage of the predetermined time of the permitting means 10b.

Figure 3:
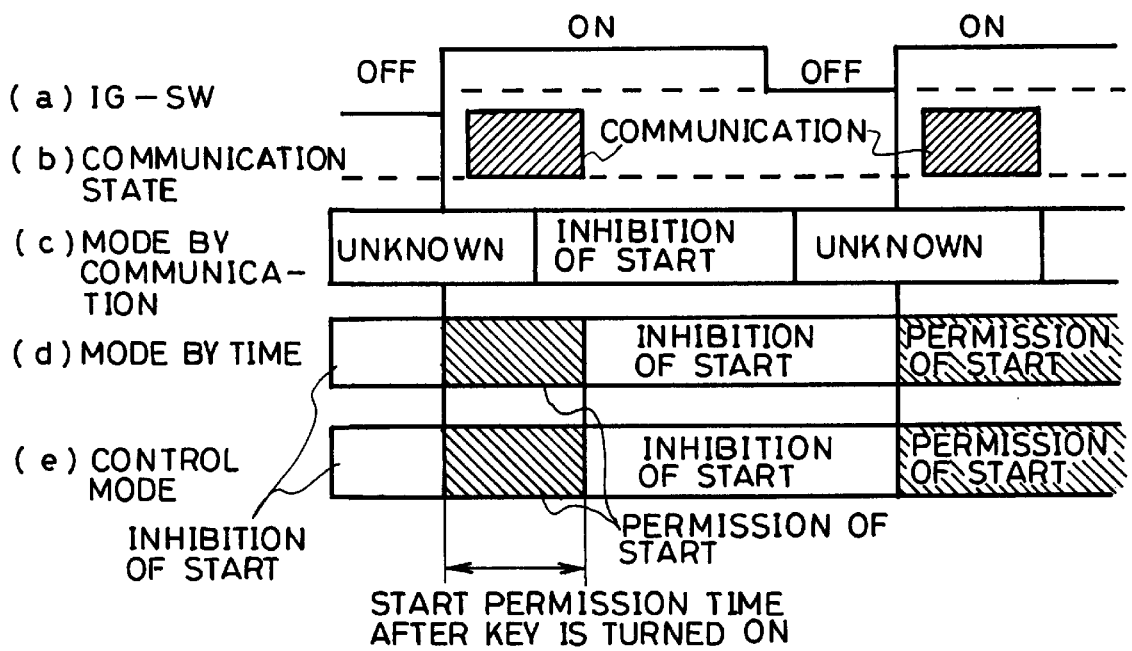
FIG. 3 is a timing chart showing the operation of Embodiment 1.

Thereafter, the case where the engine is started with a forged key will be described with reference to the timing chart of FIG. 3. When the key switch 2 is turned on, the start of the engine is permitted by the permitting means 10b and the control mode becomes a start permission mode as shown in FIG. 3(e) like the above case where the engine is started with the correct key. Meanwhile, the start judging means 8a in the antitheft apparatus 4 judges that the key used to start the engine is the forged key because an ID code transmitted from the ID code receiving means 3 does not match the predetermined ID code. The CPU 8 transmits the result of judgment to the CPU 10 in the engine controller 5 as information on whether the engine should be started. The start control means 10a in the CPU 10 generates a start inhibition signal based on this information.

Thereafter, the start permission signal generated by the permitting means 10b is switched to a start inhibition signal after the passage of the predetermined time. That is, as both the start control means 10a and the permitting means 10b generate a start inhibition signal after the passage of the predetermined time, the CPU 10 in the engine controller 5 supplies a start inhibition signal to the output circuit 11. Therefore, as shown in FIG. 3(e), the running of the engine is stopped by the stopping means 10c.

Since the above predetermined time is set to 10 sec or less, the time of 10 sec is such a short time that a car cannot be moved a long distance even when it is started by illegal means.

According to this Embodiment 1, since the start of the engine is permitted or inhibited by providing start judging means 8a for judging whether the engine should be started from the ID code of the key read by the ID code receiving means 3, start control means 10a for permitting or inhibiting the start of the engine based on the result of judgment of this start judging means 8a, and permitting means 10b for permitting the start of the engine irrespective of the result of judgment of the start judging means 8a for a predetermined time after the key is turned on, the engine can be started by the permitting means 10b immediately after the key switch is turned on. Further, since the running of the engine is continued or stopped by a start permission or inhibition signal from the start control means 10a, a theft of a car with a forged key can be prevented and the startability of the engine can be improved.

Even when it is difficult to transmit or receive correct information due to the difficulty of ensuring an operation voltage for the communication line 6 according to the operating environment at the time of the start of the engine (for example, when the temperature is extremely low or a weak battery is used) or when a so-called communication collision that the transmission or reception of information on whether the engine should be started cannot be carried out smoothly and the time required for the transmission or reception of the information is extended due to a difference in recognition between the antitheft apparatus 4 and the engine controller 5 because there is a difference in information exchange start timing between these apparatuses due to differences in reset/reset canceling voltage and reset canceling timing between these apparatuses, the engine is started immediately after the key switch 2 is turned on. Therefore, the quick startability of the engine can be ensured.

Even when a car is to be moved by illegal means, the car can be stopped after the passage of the predetermined time. Therefore, a theft of the car can be prevented.

In the above Embodiment 1, the permitting means 10b is provided in the CPU 10. It may be provided in the engine controller 5 as a hardware circuit separate from the CPU 10. For example, a signal is supplied to the CPU 10 from the permitting means 10b for the predetermined time, and a start permission signal is forcedly output from the CPU 10 while the CPU 10 receives the signal. Alternatively, a control signal for making the output signal of the CPU 10 invalid and outputting a start permission signal for a predetermined time may be applied to a signal passage between the CPU 10 and the output circuit 11 or the output circuit 11, and a start permission signal may be forcedly output from the output circuit 11.

Embodiment 2

In Embodiment 2 of the present invention, a theft of a car can be prevented with a half-broken correct key and high startability is provided. The ID code of a half-broken correct key may not be read accurately and hence, it may not be confirmed that the key is a correct key. Therefore, it is desired that the ID code should be read accurately by trying the start of the engine several times and the start of the engine should be permitted.

However, this means that the start of the engine can be tried several times even with a forged key. For example, in the above Embodiment 1, the start of the engine is permitted for 10 sec after the key switch 2 is turned on no matter whether the key used to start the engine is a correct key or not. Therefore, even when the engine is started with a forged key, the car can be driven for 10 sec. Therefore, when the engine is started with a forged key many times, the car can be moved for 10 sec each time and can be moved a long distance.

Then, in the car antitheft apparatus of Embodiment 2, when it cannot be confirmed that the key used to start the engine is a correct key, the engine is stopped after the passage of a predetermined time, a predetermined time shorter than the previous predetermined time is set at the time of starting the engine next time, the confirmation of the correct key can be carried out again, and the above predetermined time is made shorter and shorter and becomes zero in the end that the start of the engine is impossible when the engine is started with a forged key and the start of the engine is tried many times.

Although the constitution of the car antitheft apparatus according to this Embodiment 2 is the same as that of the above Embodiment 1 (FIG. 1), the predetermined time(start permission time after the switch key is turned on) which is given from the predetermined time setting means 10d to the permitting means 10b can be changed each time the engine is started.

Figure 4:
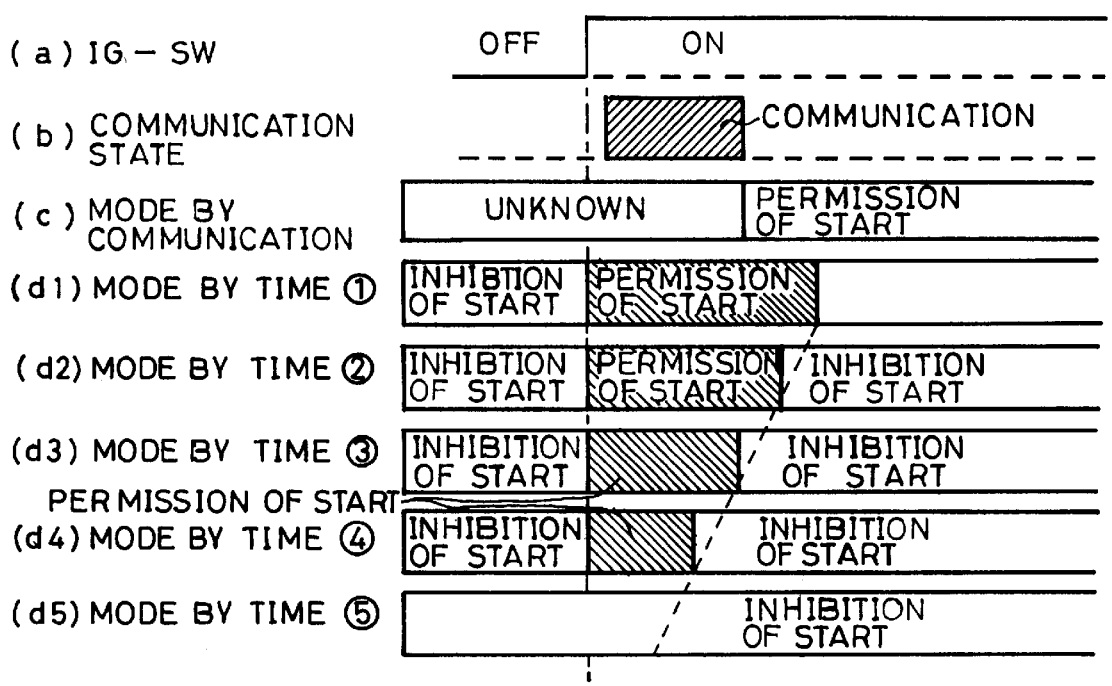
FIG. 4 is a timing chart showing the operation of Embodiment 2 of the present invention.

FIG. 4 is a timing chart showing the operation of this Embodiment 2, which shows the case where the engine is started with a forged key several times. In FIG. 4, operations (a) to (d1) are the same as the operations (a) to (d) of FIG. 3. (D2) shows an example where the engine is started with the forged key again. The predetermined time for the start of the engine of the permitting means 10b is made shorter than the previous predetermined time when it could not be confirmed that the key used to start the engine is a correct key. (D3) to (d5) show that the start of the engine is tried with the forged key several times and the predetermined time is made shorter and shorter each time the engine is forcedly stopped and becomes "0" in the end that the engine cannot be started with the forged key any longer.

Therefore, the car cannot be moved a long distance even when the start of the engine is tried with the forged key several times. When the forged key is used in FIG. 4, the car can be moved for the total of four different predetermined times. Therefore, it is desired to set the total of the four different predetermined times to a small value.

When it is confirmed that the key used to start the engine is a correct key after the start of the engine is tried with a half-broken correct key, the predetermined time which is made shorter each time the engine is started is reset to a predetermined initial value.

Therefore, the start of the engine is made possible even with a half-broken correct key by trying the start of the engine several times. Meanwhile, when a forged is used, the start of the engine is made impossible by trying the start of the engine several times, thus preventing a theft of the car.

According to this Embodiment 2, since the predetermined time is extended or shortened based on whether it is confirmed that the key used to start the engine is a correct key in the previous operation, even a half-broken correct key can be used like a normal correct key, and the start of the engine can be inhibited swiftly when a forged key is used. Further, since the start of the engine can be tried a plurality of times, it can be confirmed that even a half-broken correct key is a correct key.

Embodiment 3

In the above Embodiment 2, the car cannot be moved a long distance even when the start of the engine is tried with a forged key several times. Since the result of judgment on whether the previous key is a correct key or not and the length of the predetermined time previously set are stored in storage means (not shown) which is supplied with firm power, when firm power supplied to the storage means is cut off, operation may be reset from the state (d2), (d3), (d4) or (d5) of FIG. 4 to the state (d1). A car antitheft apparatus according to Embodiment 3 of the present invention comprises power cutoff detection means for detecting that firm power supplied to the storage means from a backup power source is cut off. When firm power supplied to the storage means is cut off, the predetermined time for the start of the engine of the next time is set to "0" and the predetermined time can be reset by the cutoff of firm power.

Figure 5:
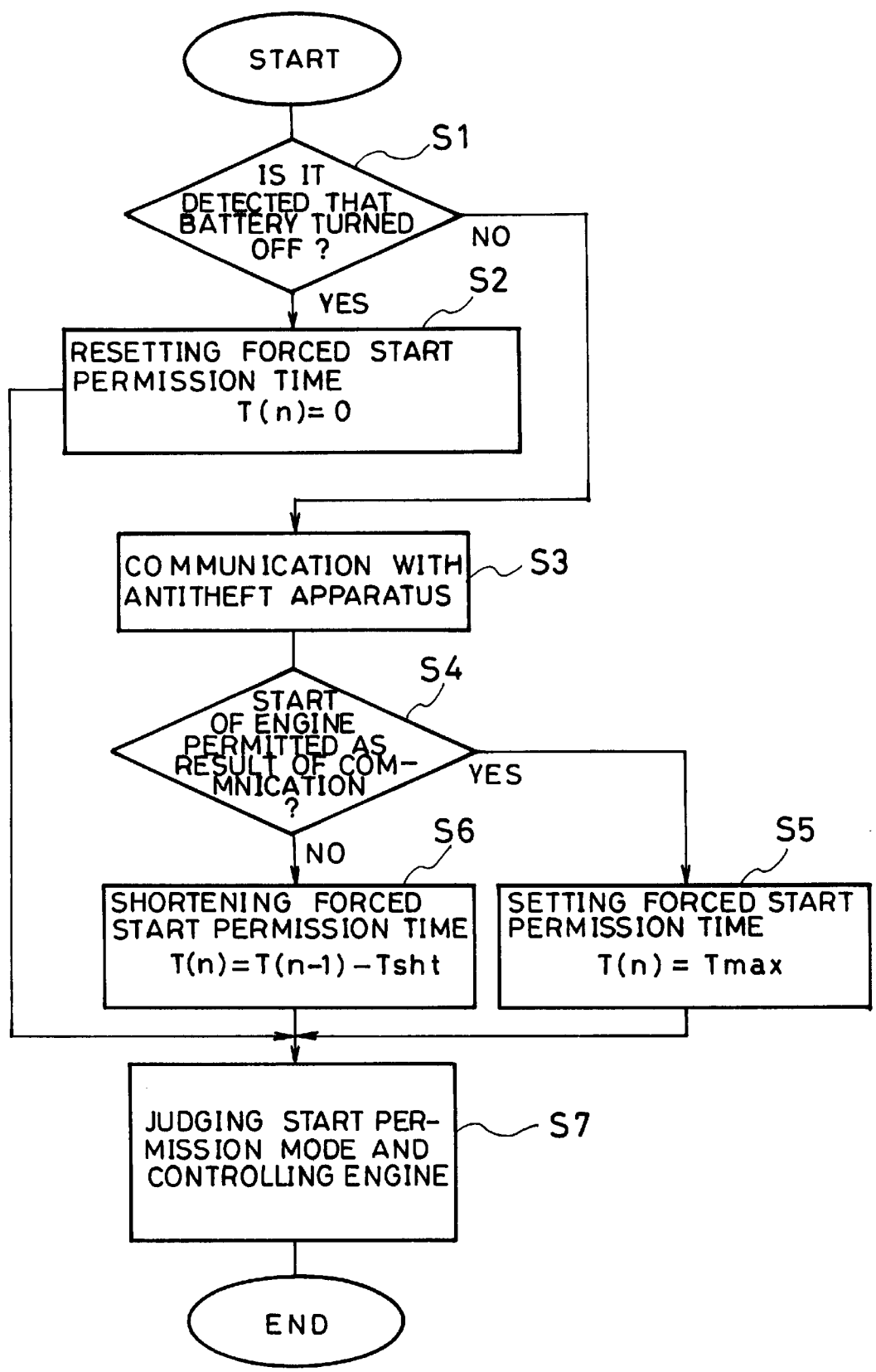
FIG. 5 is a flow chart showing how to set a predetermined time according to Embodiment 3 of the present invention.

FIG. 5 is a flow chart showing the setting of the predetermined time for the start of the engine in this Embodiment 3. In step S1, whether the battery is turned is judged based on the unshown power cutoff detection means. Since the result of judgment on the key in the previous operation and the value of the predetermined time which is made shorter each time may be reset when the battery is turned off, the routine proceeds to step S2 to set the predetermined time T(n) to "0". Thereby, the start of the engine of the next time is possible only when it is confirmed that the key used to start the engine is a correct key.

When it is not judged in step S1 that the battery is turned off, the routine proceeds to step S3 to carry out communication between the antitheft apparatus 4 and the engine controller 5. In step S4, whether the engine should be started is judged. When it is confirmed that the key used to start the engine is a correct key in step S4, the routine proceeds to step S5 to set the predetermined time T(n) for the next operation to a predetermined value Tmax, that is, a state (d1) in FIG. 4. Then, the routine proceeds to step S7. In this example, Tmax is set to 2 sec. When it cannot be confirmed in step S4 that the key used to start the engine is a correct key, the routine proceeds to step S6 to set a time obtained by subtracting a reference time Tsht (400 ms) from the predetermined time T(n−1) for the previous operation as a predetermined time T(n) for the next operation. Then, the routine proceeds to step S7. When T(n) is set to "0" in the above step S2, the routine proceeds to step 7 with T(n)=0. In step S7, based on the predetermined time T(n), a start permission signal is output for that time. In response to this start permission signal, the control of the engine is made possible.

According to this Embodiment 3, since information on judgment on the key and the updated predetermined time are erased from the storage means by turning off the battery or backup power source, a theft of a car can be prevented with more certainty because the predetermined time is set to "0" even when the start of the engine is tried many times with a forged key.

In the above Embodiments 1 to 3, the predetermined time is set. However, a factor other than time may be used. For example, the cumulative value of the number of revolutions of the engine from the start of the engine, the moving distance of the car which is calculated based on a car speed signal or the like can be set as the predetermined time. Alternatively, the above predetermined time may be set to a period from the time when the engine is started to the time when the car begins to move. For example, the above predetermined time may be set to a period from the time when the engine is started to the time when the side brake is released, a period from the time when the engine is started to the time when power is transmitted to the tires (from the time when the engine is started to the time when the gear is switched to the drive gear or from the time when the engine is started to the time when the clutch is shoved in), or a period from the time when the engine is started to the time when the car begins to move and a first car speed signal is input). When the predetermined time is set to a period from the time when the engine is started to the time when the car begins to move, the car cannot be moved at all. Therefore, even when the start of the engine is tried with a forged key several times, the car cannot be moved.

The stopping means 10c and the predetermined time setting means 10d may be incorporated in the permitting means 10b, and the permitting means 10b may set the predetermined time according to the number of times of the start of the engine, cut off a start permission signal after the passage of the predetermined time and output a start inhibition signal to stop the running engine.

As having been described above, according to the first aspect of the present invention, since start judging means for judging whether the engine should be started based on an external signal and permitting means for permitting the start of the engine irrespective of the result of judgment of the start judging means for the predetermined time after the key is turned on are provided, the engine can be started by the permitting means immediately after the key switch is turned on. Since the running of the engine is continued or stopped by a start permission or inhibition signal output based on the result of judgment of the start judging means, a theft of a car with a forged key can be prevented and the startability of the engine can be improved.

According to the second aspect of the present invention, since the predetermined time is set to about 10 sec or less, even when the car is started by illegal means, the car cannot be moved substantially and a theft of the car can be prevented.

According to the third aspect of the present invention, since the start of the engine by permitting means can be carried out a plurality of times continuously, even a half-broken correct key can be used like a normal correct key.

According to the fourth aspect of the present invention, since the predetermined time is changed based on the result of previous judgment of the start judging means, even a half-broken correct key can be used like a normal correct key and the start of the engine with a forged key can be inhibited swiftly.

According to the fifth aspect of the present invention, since the above predetermined time is set to a predetermined value when the result of the previous judgment of the start judging means is the permission of the start of the engine and to a value smaller than the previous predetermined value when the result of the above judgment is the inhibition of the start of the engine, the start of the engine with a forged key can be inhibited without fail.

According to the sixth aspect of the present invention, since power cutoff detection means for detecting that firm power supplied from power supply means is cut off is provided, and the predetermined time is set to "0" when a power cutoff is detected such illegality that information on judgment on the key and the updated predetermined time are erased from the storage means by turning off the battery or backup power source can be prevented and a theft of the car can be prevented with more certainty.

What is claimed is:

1. A car antitheft apparatus comprising:
   start judging means for judging whether an engine should be started based on an external signal;
   start control means for permitting or inhibiting the start of the engine based on a result of a judgment of the start judging means;
   permitting means for permitting the start of the engine for a predetermined time after a key switch is turned on, irrespective of the existence or nonexistence of the judgment and the result of the judgment of the start judging means; and
   stopping means for stopping the engine after at least one of the passage of the predetermined time and when the start judging means judges that the start of the engine should be inhibited.

2. The car antitheft apparatus of claim 1, wherein the predetermined time is set to about 10 sec or less.

3. The car antitheft apparatus of claim 1, wherein the start of the engine by the permitting means can be carried out a plurality of times continuously.

4. The car antitheft apparatus of claim 3, wherein the predetermined time is set to a predetermined value when the result of the previous judgment of the start judging means is the permission of the start of the engine and to a value smaller than the previous predetermined value when the result the previous judgment is the inhibition of the start of the engine.

5. The car antitheft apparatus of claim 3, wherein the predetermined time is changed based on the result of the previous judgement of the start judging means.

6. A car antitheft apparatus comprising:
   start judging means for judging whether an engine should be started based on an external signal;
   start control means for permitting or inhibiting the start of the engine based on the result of judgement of the start judging means;
   permitting means for permitting the start of the engine irrespective of the result of judgment of the start judging means for a predetermined time after a key switch is turned on; and
   stopping means for stopping the engine after the passage of the predetermined time and when the start judging means judges that the start of the engine should be inhibited,
   wherein power cutoff detection means for detecting that firm power supplied from power supply means is cut off is provided, and the predetermined time is set to "0" when a power cutoff is detected.

* * * * *